(12) United States Patent
Wannenmacher (10) Patent No.: US 8,302,259 B2
(45) Date of Patent: Nov. 6, 2012

(54) SPRING HINGE FOR SPECTACLES

(75) Inventor: Ulrich Wannenmacher, Karlsdorf (DE)

(73) Assignee: Obe Ohnmacht & Baumgartner GmbH & Co. KG, Ispringen (DE)

( * ) Notice: Subject to any disclaimer, the term of this patent is extended or adjusted under 35 U.S.C. 154(b) by 120 days.

(21) Appl. No.: 12/933,031

(22) PCT Filed: Apr. 25, 2009

(86) PCT No.: PCT/EP2009/003034
§ 371 (c)(1),
(2), (4) Date: Sep. 16, 2010

(87) PCT Pub. No.: WO2009/132809
PCT Pub. Date: Nov. 5, 2009

(65) Prior Publication Data
US 2011/0016666 A1    Jan. 27, 2011

(30) Foreign Application Priority Data
Apr. 30, 2008 (DE) .......................... 10 2008 022 317
May 8, 2008 (DE) .......................... 10 2008 023 829

(51) Int. Cl.
*G02C 5/22* (2006.01)
(52) U.S. Cl. .......................................................... 16/228
(58) Field of Classification Search .................... 16/228, 16/281, 286, 296; 351/113, 111, 114, 121, 351/153
See application file for complete search history.

(56) References Cited

U.S. PATENT DOCUMENTS

| | | | |
|---|---|---|---|
| 4,351,086 A * | 9/1982 | Drlik .............................. | 16/228 |
| 4,617,698 A | 10/1986 | Drlik | |
| 4,674,147 A * | 6/1987 | Drlik .............................. | 16/228 |
| 4,991,258 A | 2/1991 | Drlik | |
| 5,400,090 A * | 3/1995 | Chen .............................. | 351/113 |
| 5,657,107 A | 8/1997 | Wagner et al. | |
| 6,241,354 B1 * | 6/2001 | Schuchard et al. ........... | 351/113 |
| 6,505,933 B2 * | 1/2003 | Schuchard et al. ........... | 351/113 |
| 6,547,389 B2 * | 4/2003 | Hotellier ....................... | 351/153 |

(Continued)

FOREIGN PATENT DOCUMENTS

DE 3213174 C2 10/1983

(Continued)

OTHER PUBLICATIONS

International Preliminary Report on Patentability and Written Opinion of the International Searching Authority for International Application No. PCT/EP2009/003034, Mailing Date Nov. 18, 2010.

(Continued)

*Primary Examiner* — Chuck Y. Mah
(74) *Attorney, Agent, or Firm* — Harness, Dickey & Pierce, P.L.C.

(57) ABSTRACT

A spring hinge for spectacles includes a housing, a hinge element, at least one spring element, and a blocking body. The housing has a recess which at least partially accommodates the hinge element, the at least one spring element, and the blocking body. The spring element and the blocking body are coupled directly to one another. At least one spring element subjects the blocking body to a prestress force on account of which the blocking body can be displaced out of an unlocking position into a locking position in which it interacts with a locking surface.

21 Claims, 9 Drawing Sheets

U.S. PATENT DOCUMENTS

| | | |
|---|---|---|
| 2003/0172492 A1 | 9/2003 | Schuchard |
| 2004/0237258 A1* | 12/2004 | Montagner ............... 16/228 |
| 2007/0089268 A1* | 4/2007 | Genelot ............... 16/228 |
| 2008/0192199 A1* | 8/2008 | Hotellier ............... 351/153 |

FOREIGN PATENT DOCUMENTS

| | | |
|---|---|---|
| DE | 9114193 U1 | 3/1993 |
| DE | 69407351 T2 | 7/1998 |
| EP | 0426947 A2 | 5/1991 |
| EP | 0426947 B1 | 5/1991 |
| EP | 0628846 A1 | 12/1994 |
| EP | 0632306 A1 | 1/1995 |
| WO | 01/31386 A1 | 5/2001 |
| WO | 03/065108 A1 | 8/2003 |

OTHER PUBLICATIONS

International Search Report for PCT/EP2009/003034, ISA/EP, Rijswijk, NL, mailed Aug. 17, 2009.

Written Opinion of the ISA for PCT/EP2009/003034, ISA/EP, Rijswijk, NL, mailed Aug. 17, 2009.

* cited by examiner

Fig.3C

SPRING HINGE FOR SPECTACLES

CROSS-REFERENCE TO RELATED APPLICATIONS

This application is a 371 U.S. National Stage of International Application No. PCT/EP2009/003034, filed Apr. 25, 2009. This application claims the benefit of German Applications No. DE 102008022317.4, filed Apr. 30, 2008 and DE 102008023829.5, filed May 8, 2008. The disclosures of the above applications are incorporated herein by reference.

FIELD

The invention relates to a spring hinge for spectacles.

BACKGROUND

Spring hinges of the mentioned type are known in the art. The European patent specification EP 0 426 947 B1 addresses a spring hinge for spectacles that has a housing, a hinge element, a spring element and a blocking body. In addition, a spring piston is provided which transmits the forces from the spring element into the blocking body so that the same can be displaced into a locking position. The hinge element, the blocking body, the spring piston and the spring element can be assembled to form a unit which can be inserted as a whole into the housing. Here, it is apparent that in particular the hinge element is manufactured in a comparatively complicated and massive manner which results in high production costs.

The international patent application WO 01/31386 A1 implies a spring hinge which also has a housing, a spring element, a blocking body and a spring piston. Here, the housing serves at the same time as hinge element and is displaced relative to the temple piece during a deflection of the temple piece beyond the stop position in the wearing position in such a manner that the spring element is compressed. The blocking body engages with a snap-in element with the temple piece so that the forces are transmitted into the same and push the same back into the wearing position. To be able to fulfill its function as hinge element, the housing must be guided in the temple piece. For this purpose, viewed in a longitudinal section, a U-shaped guiding groove is provided in which the housing engages with an edge. The disadvantage of this configuration is that not only a complicated hinge element is provided, but also that the temple piece has to be machined in a complex manner to obtain the guiding groove.

SUMMARY

It is the object of the invention to provide a spring hinge for spectacles that does not have the mentioned disadvantages.

A spring hinge for spectacles is proposed having a spring element and a blocking body coupled directly to one another. At least one spring element subjects the blocking body to a prestress force due to which the blocking body can be displaced out of an unlocking position into a locking position in which it interacts with a locking surface. Due to the direct coupling of spring element and blocking body, the spring piston can be eliminated. Moreover, without any further measure, the spring element subjects the blocking body to a prestress force by means of which the blocking body can be displaced out of an unlocking position into a locking position. In this manner, a very simple locking of the hinge is possible, wherein, at the same time, a high functional reliability is ensured.

Also preferred is a spring hinge which is distinguished in that the coupling between spring element and blocking body is configured such that, also in its locking position, the blocking body is subjected to a prestress force, in particular tilting moment. This means a further increase of the functional reliability since higher forces are necessary to displace the blocking body out of the locking position into the unlocking position than it would be case if the blocking body would not be subjected to a prestress force in the locking position.

Also preferred is a spring hinge which is distinguished in that a coupling area between the at least one spring element and the blocking body is provided, wherein the coupling area has a center axis which, at least when the hinge is locked, encloses an angle with the basic alignment of the at least one spring element. This means that, at least when the blocking body is in its locking position, the spring element, in the area of its coupling with the blocking body, encloses an angle with its basic alignment, thus is angled.

Furthermore, a spring hinge is preferred wherein due to the angle which the center axis of the coupling area between the at least one spring element and the blocking body encloses with the basic alignment of the at least one spring element, forces are transmitted into the blocking body, which forces push the same in a locking position. By means of this arrangement, prestress forces can be transmitted in a particularly simple manner into the blocking body. Due to the angled position of the spring element in the area of the coupling with the blocking body, the spring elements exert reset forces on the blocking body which push the same into a locking position.

Also preferred is a spring element wherein the hinge element is U-shaped. Thus, the hinge element can have a particularly simple geometrical shape.

Furthermore, a spring hinge is preferred wherein the hinge element is formed as stamping part. The hinge element can consist of a thin sheet metal and can be produced with a very simple method. For this purpose, the hinge element is first stamped out of a thin sheet metal and then bent into its U-shape.

Also preferred is a spring hinge which is distinguished in that the hinge element has two hinge leaves. In this case, on each arm of the U-shaped hinge element, one hinge leaf is provided.

Further advantages configurations arise from the subclaims.

DRAWINGS

The invention is explained hereinafter in more detail by means of the drawing.

In the figures:

FIG. 3A/1 shows a perspective view of a first exemplary embodiment of a blocking body;

FIG. 3A/2 shows a perspective view of a further exemplary embodiment of a blocking body;

FIG. 6 shows a perspective view of an assembled spring hinge engaging with a further hinge part.

DETAILED DESCRIPTION

Figure 1:
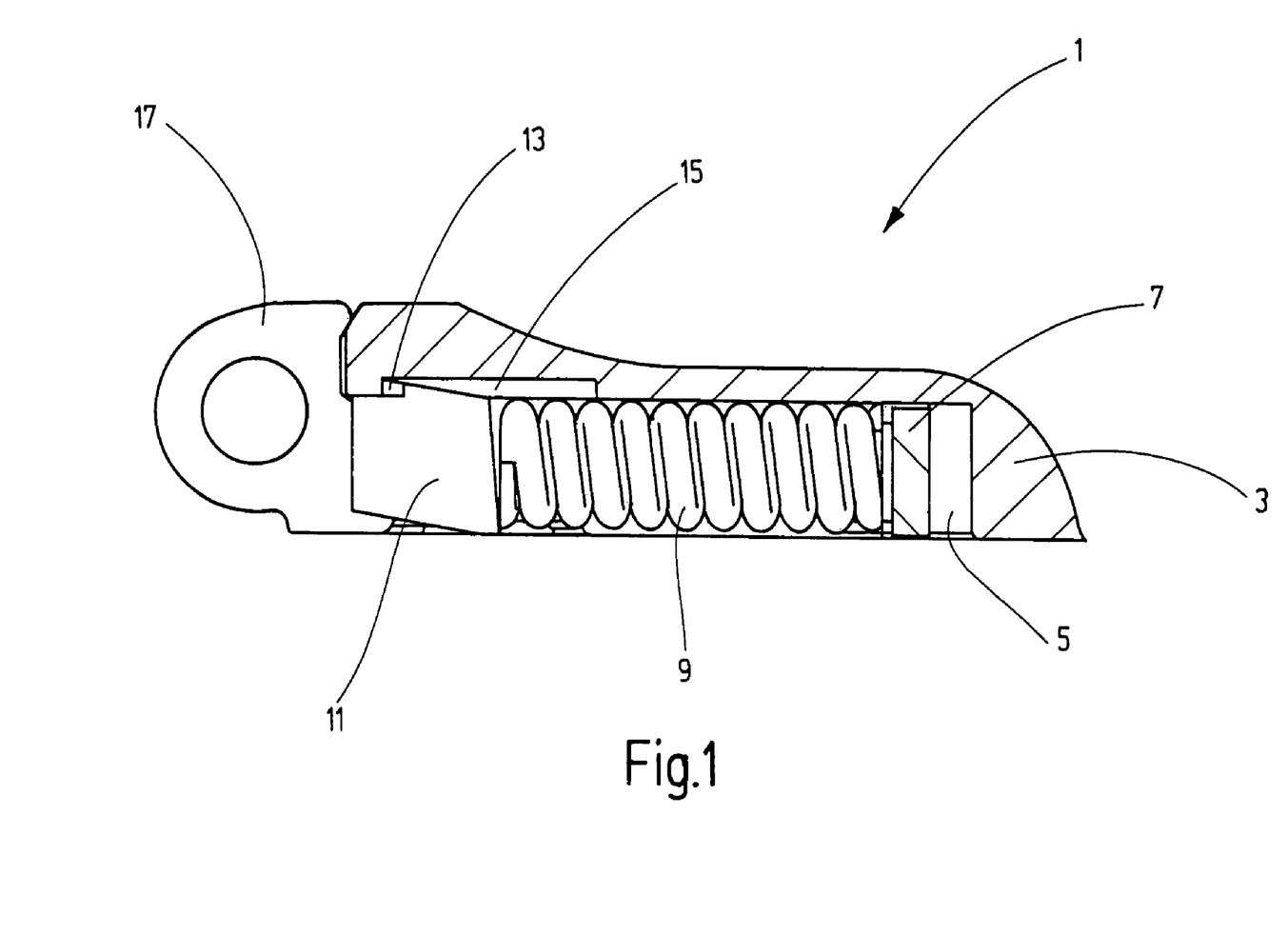
FIG. 1 shows a cross-sectional view through a spring hinge.

FIG. 1 shows a spring hinge 1. It comprises a housing 3 which has a recess 5 which at least partially accommodates a hinge element 7, a spring element 9, and a blocking body 11.

Here, the spring element 9 is configured as a single helical spring. However, it is also quite possible to provide more than one spring element. For example, a plurality of spring elements can be arranged side by side or one behind the other. It is also possible to provide at least one meander spring for generating a prestress force on the blocking body. Also, helical springs as well as meander springs and other spring elements can be provided. Important is that at least one spring element is present that is able to transmit a prestress force into the blocking body.

The blocking body 11 has a nose 13 which engages in a second recess 15 of the housing 3 when the blocking body 11 is in its locking position. The spring element 9 is directly coupled with the blocking body 11 so that reset or prestress forces coming from the spring element 9 are introduced directly into the blocking body 11. An intermediate transmission member such as, for example, a spring piston, thus is not required.

The hinge element comprises two hinge leaves of which only the rear leaf 17, as viewed by the viewer, is illustrated. With the spectacles completely assembled, the leaves of the hinge element 7 engage between corresponding leaves of a hinge part that is not illustrated here. The spring hinge illustrated here can optionally be fastened to a temple piece or a center piece of spectacles. The corresponding hinge part can then be fastened in each case to the other part of the spectacles.

Figure 2:
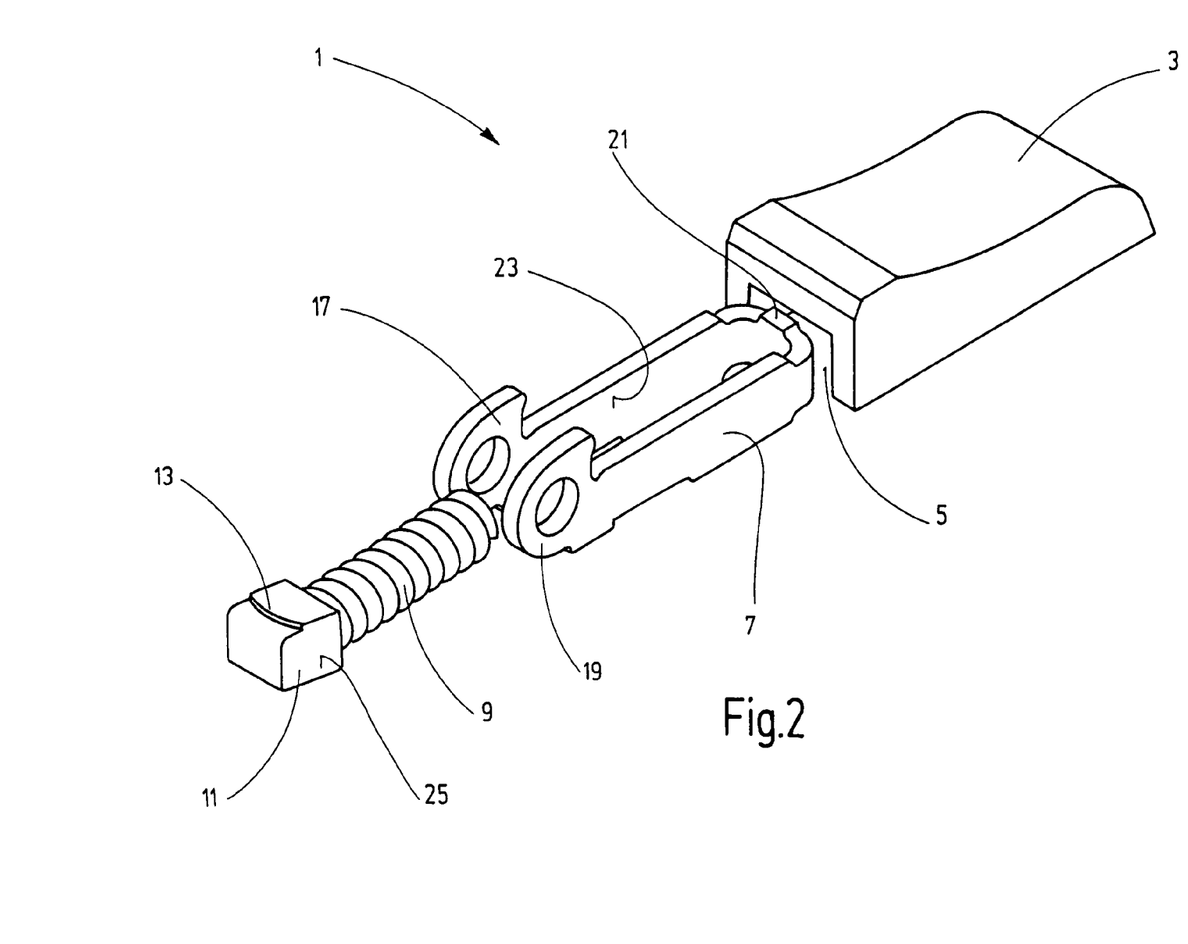
FIG. 2 shows a perspective exploded view of a first exemplary embodiment of blocking body.

FIG. 2 shows a perspective exploded view of a spring hinge. Identical and functionally identical parts are designated with identical reference numbers so that in this respect, reference is made to the description of FIG. 1. The U-shaped form of the hinge element 7 is clearly shown. It is preferably stamped out of sheet metal and, in a second method step, is bent into its illustrated U-shaped form. Of course, the hinge element 7 can also be produced in a different manner, for example in an injection molding method or as a milled part. The hinge element 7 has two hinge leaves of which only the rear leaf 17 and the front leaf 19, as viewed by the viewer, are illustrated. Moreover, in the area of its curve, the hinge element 7 comprises two sections with reduced height so that an upper projection 21 and a lower projection, which is not illustrated here, are formed.

The hinge element 7, the spring element 9, and the blocking body 11 can be combined in a pre-assembled unit. Here, for example, the spring element 9 can be welded, soldered or adhered the hinge element 7. It is particularly advantageous if the spring element 9 is welded, soldered or adhered to the upper projection 21 and the lower projection of the hinge element 7. Preferably, a laser welding method is used here. A configuration of the hinge element 7, the spring element 9, and the blocking body 11 as pre-assembled unit is preferred because during the final assembly of the spectacles no longer small and unhandy components have to be incorporated but only a single unit which is easy to handle.

As is apparent from the illustration, when the spring hinge is assembled, the blocking body 11 floats freely between the arms of the U-shaped hinge element 7. During actuation of the spring hinge 1, the inner side faces of the hinge element 7 of which, as viewed by the viewer, only the rear side face 23 is visible here, slide on the side faces of the blocking body 11 of which, as viewed by the viewer, only the front side face 25 is visible here. In this manner, the hinge element 7 is guided by the blocking body 11. Furthermore, the blocking body 11 absorbs forces which are laterally transmitted into the hinge element 7 so that the same cannot be compressed and thus deformed.

Figure 3A:
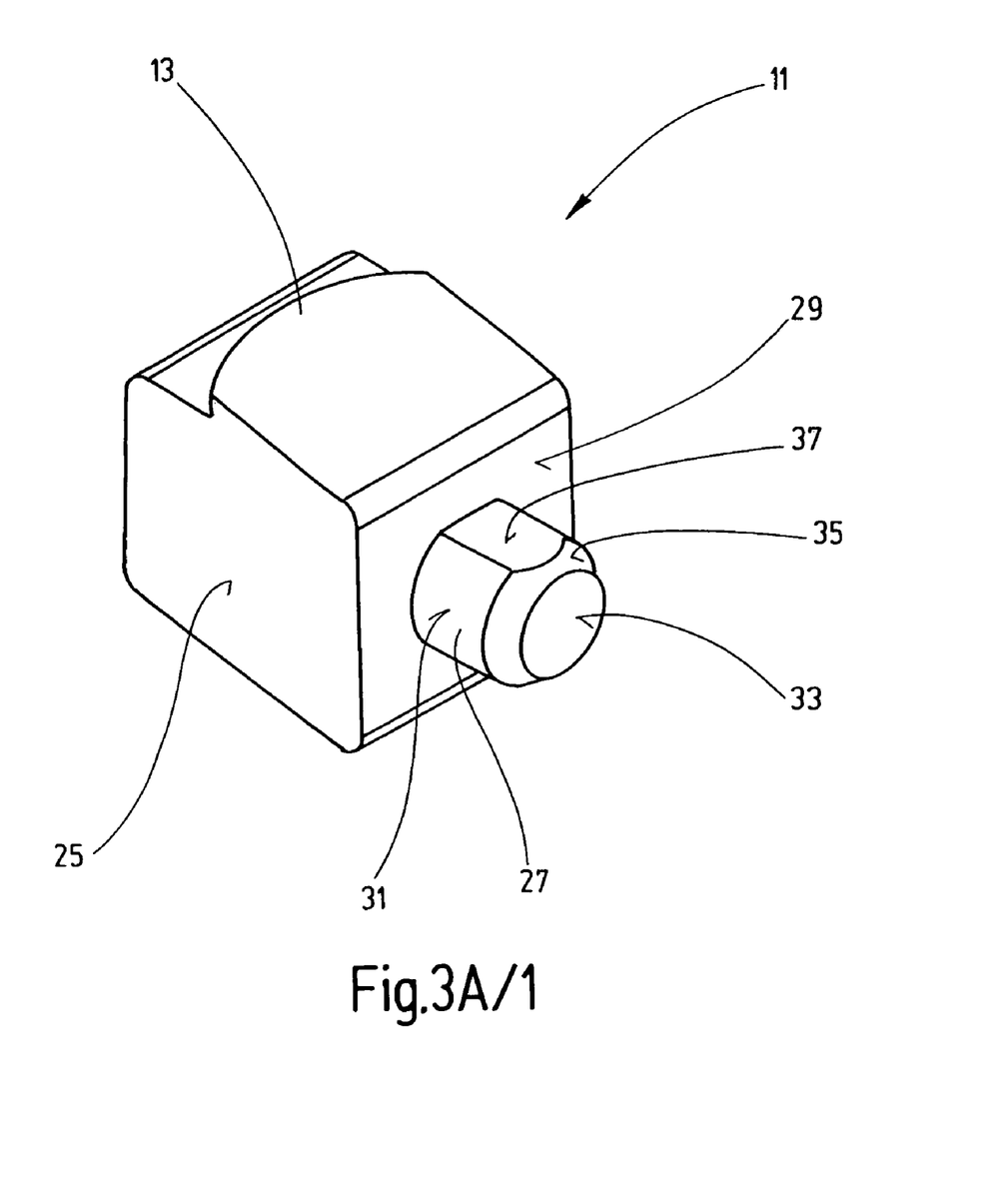

Hereinafter, the blocking body 11 is explained in more detail: FIG. 3A/1 shows a perspective view of a first exemplary embodiment of a blocking body 11. Identical and functionally identical parts are designated with identical reference numbers so that in this respect, reference is made to the previous description. The blocking body has a pin 27 which extends from a rear face 29. The definition of a rear and front side was made here in such a manner that the nose 13 faces the front side of the blocking body 11. The pin 27 serves for coupling the blocking body 11 with a spring element 9.

Between a substantially cylindrical outer surface 31 and an end face 33 of the pin 27, a chamfer 35 is provided which makes it easier to slide the spring element 9 over the pin 27 so that they are coupled to one another. Moreover, the outer surface 31 has a flat 37 extending in longitudinal direction of the pin, and said flat too facilitates the coupling between spring element 9 and the pin 27.

FIG. 3A/2 shows a perspective view of a further exemplary embodiment of a blocking body. The pin 27 is barrel-shaped here so that also the outer surface 31 is contoured accordingly. At its end facing the rear face 29, the pin 27 has a smaller diameter which increases along the extension of the pin 27 towards a middle region. In the middle region, the diameter of the pin 27 reaches its highest value and decreases again towards the end face 33. Preferably, in the middle region, a cylindrical section Z can be provided which has the largest diameter of the pin 27. Due to the barrel shape, the pin 27 provides a better grip for a spring element 9 because the spring element 9 is widened in the region of the largest diameter of the pin 27 and in this manner rests firmly against the outer surface 31 of the pin 27. Depending on how the largest outer diameter of the pin 27 is selected relative to the inner diameter of the spring element 9, the barrel-shaped pin can be tilted in the spring element 9. To prevent this it is provided that the spring element's 9 front side facing the blocking body 11 abuts planarly against the rear face 29. Apart from that, a planar abutment of the front side of the spring element 9 against the rear face 29 is also provided in all other exemplary embodiments of a blocking body 11 even if it is not particularly necessary. For this purpose, the front side of the spring element is preferably ground. In this manner, the spring element's 9 front side facing the blocking body 11 preferably lies in an imaginary plane. Here, it abuts planarly against the rear face 29 of the blocking body 11.

Also, in a manner not illustrated here, the pin 27—as viewed in cross-section—can have a polygon-shaped outer surface 31. This results in edges along the extension of the pin 27, which edges result in a particularly good grip of the blocking body 11 on the spring element 9. The barrel-shaped configuration of the pin 27 as well as—as viewed in cross-section—a polygon-shaped configuration of the outer surface 32 result in a better grip of the spring element 9 on the pin 27. This has the advantage that the spring element 9 can not get lost during transport of the blocking body 11 if the same is connected to the spring element 9. Conversely, in case of a pre-assembled unit consisting of hinge element 7, spring element 9, and the blocking body 11, the blocking body 11 cannot get lost if it is securely connected to the spring element 9.

Here, the pin 27 is addressed exemplary as coupling means between the spring element 9 and the blocking body 11. It is also possible to provide a recess in the blocking body 11 in which the spring element can be partially inserted. A magnetic coupling is also possible.

On the side opposite to the rear face 29, the exemplary embodiment of a blocking body 11 illustrated here has a groove which serves as unlocking groove N. When the spring hinge 1 is locked, it is possible to insert a tool, for example a screw driver, into the unlocking groove N and to displace the blocking body 11 in this manner from its locking position into an unlocking position. The unlocking groove N is notch-shaped, however, other cross-sectional shapes, for example a semicircular cross-section, are also possible. It is essential, though, that on the blocking body's 11 side opposing the rear face 29, an indentation is formed in which a tool can be inserted to unlock the blocking body 11.

Figure 3B:
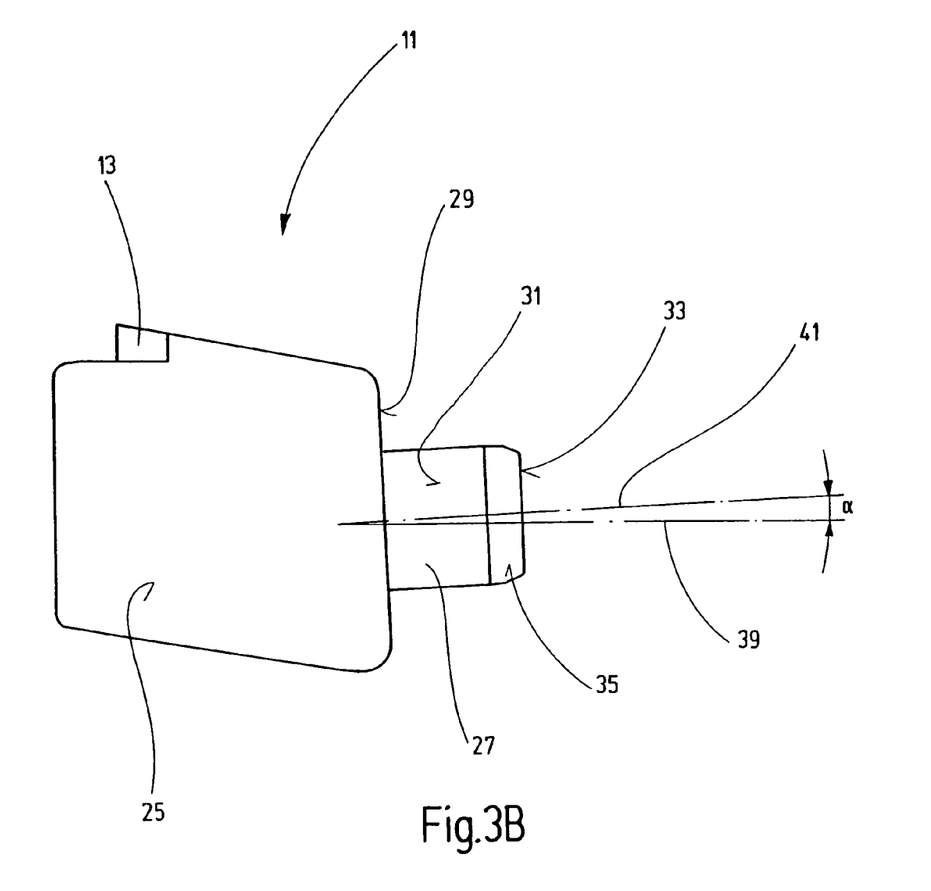
FIG. 3B shows a side view of the first exemplary embodiment of a blocking body.

FIG. 3B shows a side view of the first exemplary embodiment of the blocking body 11. Identical and functionally identical parts are designated with identical reference numbers so that in this respect, reference is made to the previous description. The blocking body 11 is illustrated here in a position that it assumes in its locking position. The imaginary horizontal axis 39 thus defines a center axis of the housing when the spring hinge 1 is locked and thus a basic alignment that the spring element 9 has in this state. As an example, an imaginary axis 41 is perpendicular to the rear face 29 of the blocking body 11; it represents a center axis of the pin 27. It is clearly shown that the axis 41 and the axis 39 enclose an angle α with one another. It therefore appears that here the rear face 29 together with an imaginary plane, which is perpendicular to the basic alignment of the spring element, also encloses the angle α. Furthermore, the center axis of the pin 27 together with the basic alignment of the spring element 9 encloses the angle α. The angle α can be, for example, 0° to 6°, preferably 2° to 4°, and in a particularly preferred manner 3°.

If, instead of the pin 27, the blocking body 11 is provided with a recess which partially accommodates the spring element 9, then, according to the above, it is clear that a center axis of said recess must coincide with the imaginary axis 41. In this case, also the center axis of the recess encloses an angle with the basic alignment of the spring element 9. If a magnetic coupling is provided between blocking body 11 and spring element 9, the occurring magnetic forces must be sufficiently strong in order that the spring element's 9 end facing the blocking body 11 planarly abuts against the tilted rear face 29. In this case, the normal vector of the rear face 29 and the spring element's 9 part facing the blocking body 11 enclose an angle with the basic alignment of the spring element 9.

Figure 3C:
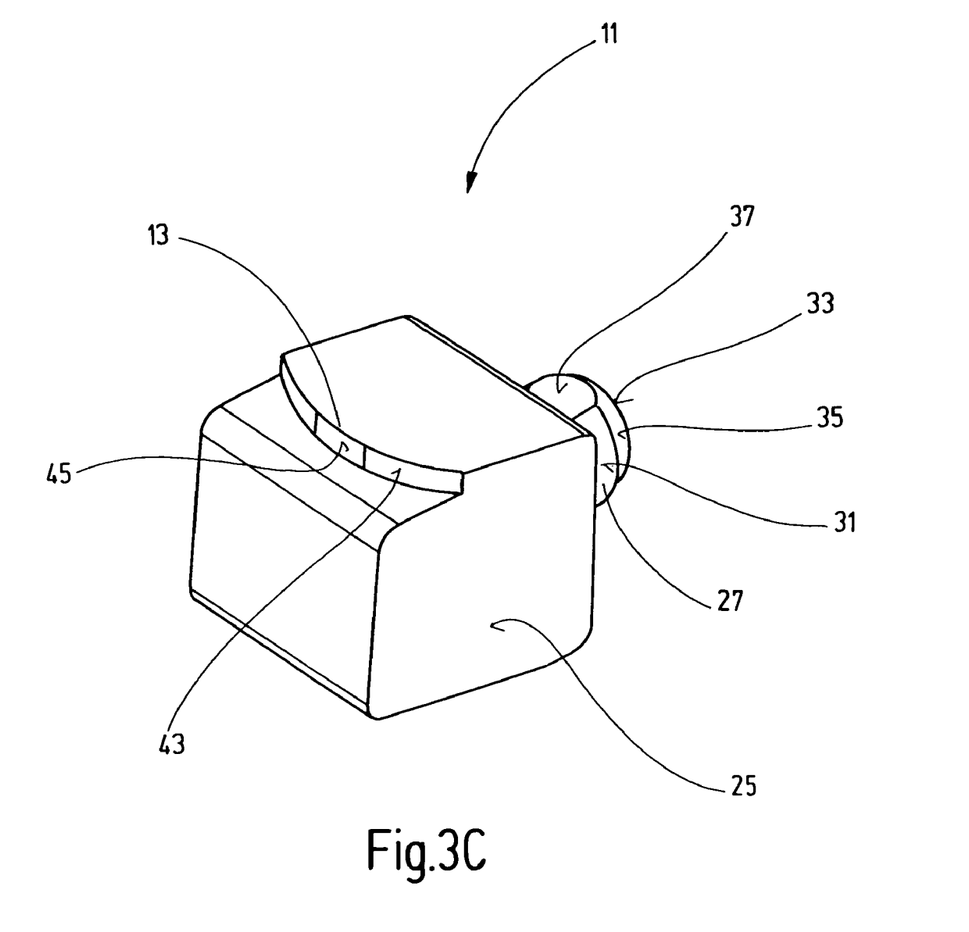
FIG. 3C shows a further perspective view of the first exemplary embodiment of a blocking body.

FIG. 3C shows a further perspective view of the first exemplary embodiment of the blocking body 11. Identical and functionally identical parts are designated with identical reference numbers so that in this respect, reference is made to the previous description. It is clearly visible that the nose 13 of the blocking body 11 has the shape of a circular arc. A cylindrically shaped section of the outer surface 43 of the nose 13 has a flat 45 which serves as contact face. Therewith, the blocking body 11 abuts in its locking position against a support face which serves as locking surface and is formed in the second recess 15 of the housing 3.

Apart from that, the blocking body 11 can be manufactured in a very simple manner with a metal powder injection molding method. Of course, other manufacturing methods such as, for example, machining from solid, are also conceivable. However, with a metal powder injection molding method, the blocking body 11 can be manufactured in a very material-saving and simple manner.

Figure 4:
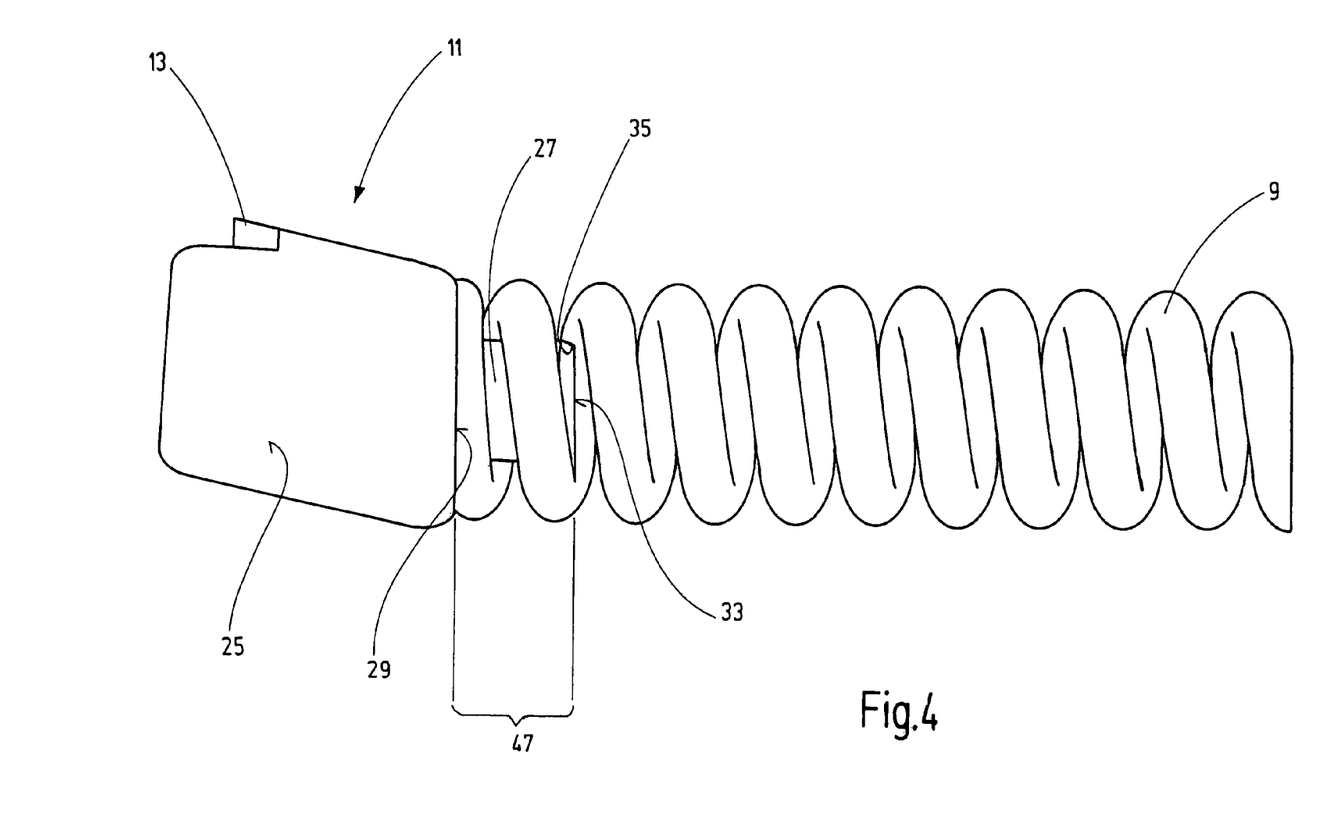
FIG. 4 shows a side view of a blocking body coupled with a spring element.

FIG. 4 shows the coupling between the spring element 9 and the blocking body 11. Identical and functionally identical parts are designated with identical reference numbers so that in this respect, reference is made to the previous description. The spring element 9 is slid over the pin 27 of the blocking body 11 so that a direct coupling is generated. A coupling area 47 between the spring element 9 and the blocking body 11 is clearly visible. The illustrated elements are outside of the housing 3 so that due to the reset forces of the spring element 9, the pin 27 is oriented parallel to the basic alignment of the same, this is aligned with the spring element. Here too, the rear face 29 of the blocking body 11 is perpendicular to the basic alignment of the spring element 9. Due to its spring properties, the same will always try to be aligned in parallel to the basic alignment along its entire extension. It goes without saying that if the coupling between the spring element 9 and the blocking body 11 would be effected through a recess in which the spring element partially engages, also a center axis of the recess would be oriented here in parallel to the basic alignment of the spring element 9. Also, in case of a magnetic coupling, the rear face 29 would be perpendicular to the basic alignment of the spring element 9.

Figure 5:
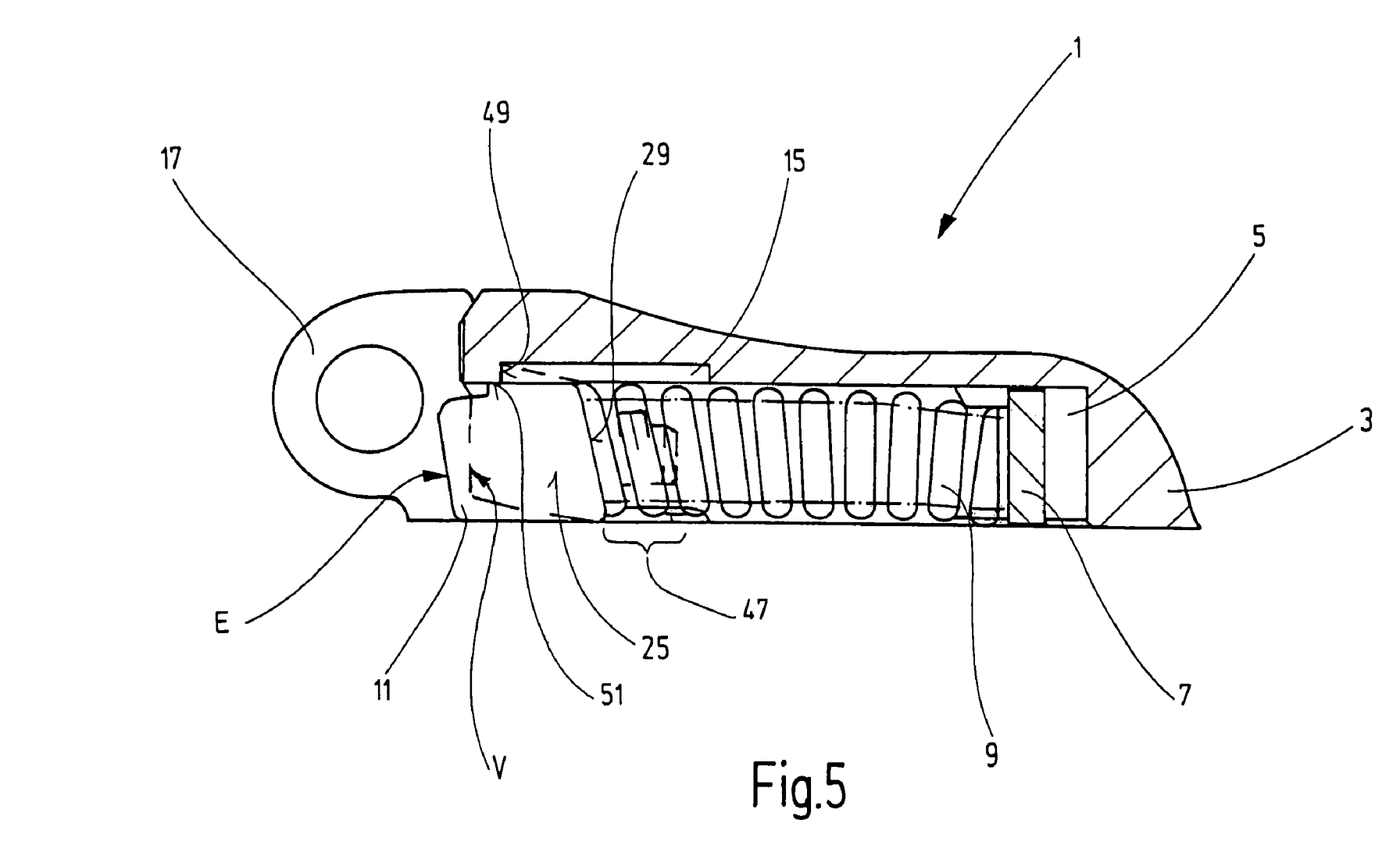
FIG. 5 shows a sectional view through a spring hinge, wherein an unlocking position and a locking position of a blocking body are shown.
Figure 9:
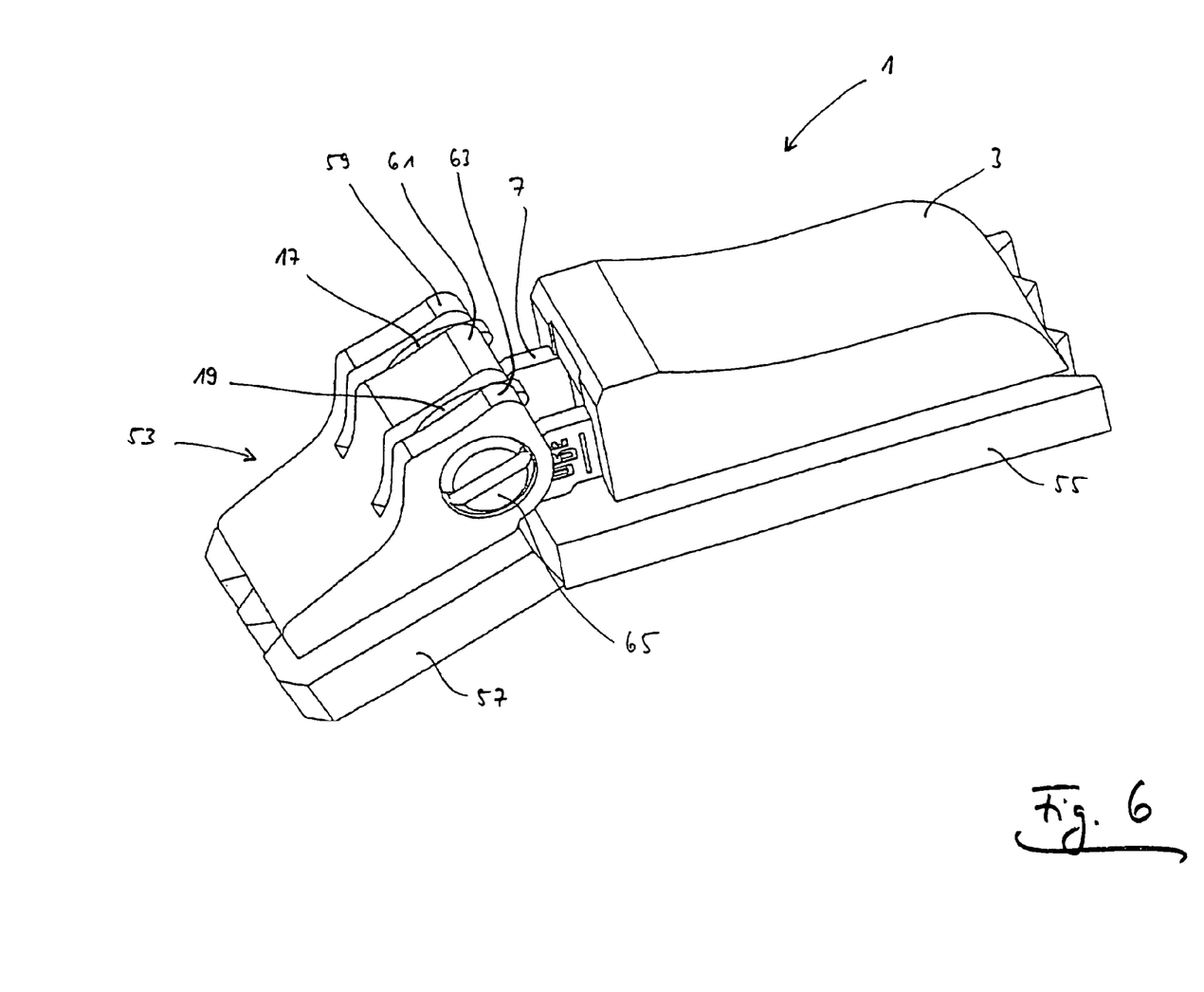

FIG. 5 shows a sectional view through a spring hinge 1. Identical and functionally identical parts are designated with identical reference numbers so that in this respect, reference is made to the previous description. The blocking body 11 is illustrated in two different positions: With a solid outline in its unlocking position E and with a dashed line in its locking position V. It is apparent that in the locking position, the flat 45 of the nose 13 of the blocking body 11 abuts against a contact face which is formed in the second recess 15 of the housing 3 and serves as locking surface 49, and thus effects a locking of the spring hinge 1.

The housing 3 rests on a non-illustrated bottom which is either formed by a temple piece or a center piece of the spectacles. Said bottom closes the housing 3 at the bottom.

If the hinge element 7, the spring element 9 and the blocking body 11 are inserted into the housing 3, for example as pre-assembled unit, the nose 13 of the blocking body 11 must be moved past an upper wall 51 of the housing 3. Hereby, the blocking body 11 is tilted about an axis which is perpendicular to the side face 25 of the blocking body 11. Thus, in said unlocking position, the center axis of the pin 27 encloses an angle with the basic alignment of the spring element 9 which angle is larger than the angle α which both of them enclose in a locking position. Through the deformation of the spring element 9 caused in this manner, prestress forces are transmitted via the pin 27 from the spring element 9 into the blocking body 11, due to which forces, the blocking body 11 can be displaced, here tilted, from the unlocking position into a locking position. It goes without saying that the same effect can be obtained if the coupling between spring element 9 and blocking body 11 is achieved through a recess provided in the blocking body 11 in which recess the spring element 9 partially engages. The same effect can also be achieved with a magnetic coupling between spring element 9 and blocking body 11 provided that the magnetic forces are high enough to retain the spring element's 9 front side facing the blocking body 11 in an orientation parallel to the rear face 29.

Preferably, it is provided that, with its front side facing the blocking body 11, the spring element 9 planarly abuts against the rear face 29. For this, the front side of the spring element 9 can be ground so that it preferably lies in an imaginary plane.

In the illustrated exemplary embodiment, the center axis of the pin 27 encloses an angle α with the basic alignment of the spring element 9 even if the blocking body 11 is in its locking position. By the resulting deformation of the spring element 9 in the coupling area 47, the blocking body 11 is subjected to a prestress force, here tilting moment, also in its locking position, which tilting moment retains the blocking body securely in the locking position.

It is also clear that the coupling area 47 between spring element 9 and blocking body 11 has a center axis which, in this exemplary embodiment, encloses an angle with the basic alignment of the spring element 9 in the unlocking position as well as in the locking position of the blocking body 11.

It is apparent from the aforementioned that in the illustrated exemplary embodiment, due to the angle which the center axis of the coupling area between the spring element 9 and the blocking body 11 encloses with the basic alignment of the spring element 9, forces are transmitted into the blocking body 11, which forces push the same in a locking position. Preferably, the blocking body 11 is not only pushed into the locking position but is additionally subjected to a force that retains it securely in this position. An unintended unlocking is thus very reliably prevented.

However, it is also possible that the spring element 9 exerts a prestress force on the blocking body 11 by means of which force the blocking body 11 can be displaced from an unlocking position into a locking position without an angle α being provided in the coupling area 47. For example, it can be provided that the center axis of the coupling area 47 does not enclose an angle with the basic alignment of the spring element 9 when the blocking body 11 is in its locking position. In this case, the coupling area 47 would always enclose an angle with the basic alignment of the spring element 9 if the blocking body 11 would be pushed in its unlocking position, for example, would be tilted about an axis perpendicular to the side face 25. In this manner, the blocking body 11 would be pushed from its unlocking position into its locking position, but would be free from prestress forces, in particular tilting moments. Since the spring element 9 is prestressed along its longitudinal extension, even with the hinge element 7 completely inserted into the housing 3, also in this case, the blocking body 11 would be pressed with the flat 45 against the locking surface 49. Also in this manner, a sufficiently secure locking of the spring hinge 1 would be ensured.

Even if the center axis of the coupling area 47 does not enclose an angle with the basic alignment of the spring element 9 when the blocking body 11 is in its locking position, forces can be transmitted into the blocking body which forces retain the same in its locking position. For this it can be provided that the spring element's 9 front side facing the blocking body 11 encloses an angle with the basic alignment of the spring element. When the spring element 9 is prestressed, an asymmetric force acts on the rear face 29 of the blocking body 11 resulting in a tilting moment which—with correct relative orientation of the spring element 9 to the blocking body 11—pushes the blocking body 11 from its unlocking position in its locking position and retains it there securely.

In the figures it was assumed that the locking surface 49 is formed on the housing. However, it is also possible to provide the locking surface on that part of the spectacles to which the spring hinge is attached.

FIG. 6 shows a perspective view of a spring hinge 1 which is engaged with a hinge part 53. Identical and functionally identical parts are designated with identical reference numbers so that in this respect, reference is made to the previous description. The spring hinge 1 is arranged on a spectacle element 55 which can be a temple piece or a center piece of spectacles. For reasons of simplicity, the spectacle element 55 is illustrated broken at the top right.

The hinge part 53 is arranged on the spectacle element 57. For reasons of simplicity, the same is illustrated broken at the lower left. If the spring hinge 1 is arranged on a spectacle element 55 which is configured as temple piece, the hinge part 53 is preferably arranged on a spectacle element 57 configured as center piece of a spectacle. Conversely, the hinge part 53 is preferably arranged on a spectacle element 57 configured as temple piece if the spring hinge 1 is arranged on a spectacle element 55 which is configured as center piece of a spectacle.

Preferably, the spring hinge 1 can be attached with the housing 3 on the spectacle element 55. For this, the housing 3 can preferably be soldered, welded, laser welded, spot-welded, adhered on the spectacle element 55 or can be attached in any other suitable manner. It is preferred that also the hinge part 53 is attached by means of one of the mentioned methods or another suitable method on the spectacle element 57.

It is shown that the leaves 17, 19 of the hinge element 7 engage between corresponding leaves 59, 61 and 63 of the hinge part 53. The leaves 17, 19 of the hinge element 7 as well as the leaves 59, 61 and 63 of the hinge part 53 each have one hinge eye, wherein the hinge eyes in FIG. 6 are arranged in alignment with one another. A coupling element 65, which preferably is configured as screw, penetrates in a manner known per se the hinge eyes and thus provides an articulated connection between the spring hinge 1 and the hinge part 53.

FIG. 6 shows the hinge arrangement consisting of the spring hinge 1 and the hinge part 53 in a position in which a temple piece is displaced beyond the stop position in the wearing position in such a manner that the spring element 9 is compressed. The same thus transmits here a reset force into the hinge arrangement which force finally pushes the temple piece back in its wearing position.

Overall it is apparent that the proposed spring hinge has a constructionally very simple and, at the same time, functionally reliable configuration. Additional elements such as transmission members or spring pistons are not required here. Moreover, it is preferably provided that the hinge element 7, the spring element 9, and the blocking body 11 are combined in a pre-assembled unit which can be inserted into the housing 3 in a simple manner. The hinge element 7 is preferably designed as a simple stamping part so that it can be produced in a simpler and more cost-effective manner than in known spring hinges. The blocking body can be tilted in a simple manner by means of a tool from its locking position into an unlocking position so that the spring hinge 1 can readily be disassembled, for example, to carry out maintenance, cleaning or to replace defective parts.

The invention claimed is:
1. A spring hinge for spectacles comprising:
a housing;
a hinge element;
a blocking body; and
at least one spring element, the at least one spring element coupled directly to the blocking body, the at least one spring element biasing the blocking body with a prestress force from an unlocking position into a locking position in which the blocking body interacts with a locking surface of said housing; and wherein the housing at least partially accommodates the hinge element, the at least one spring element and the blocking body.

2. The spring hinge according to claim 1, wherein the at least one spring element is coupled to the blocking body such that the blocking body is also subjected to a prestress force in the locking position.

3. The spring hinge according to claim 1, wherein a coupling area is provided between the at least one spring element and the blocking body, the blocking body having a center axis which, at least when the hinge is locked, encloses an angle with an alignment axis of the at least one spring element.

4. The spring hinge according to claim 3, wherein forces are transmitted into the blocking body which push the blocking body into a locking position.

5. The spring hinge according to claim 1, wherein the hinge element is U-shaped.

6. The spring hinge according to claim 1, wherein the hinge element is formed as a stamping part.

7. The spring hinge according to claim 1, wherein the hinge element has two spaced apart arms.

8. The spring hinge according to claim 7, wherein the blocking body floats freely between the arms of the hinge element.

9. The spring hinge according to claim 1, wherein the hinge element has at least one projection.

10. The spring hinge according to claim 1, wherein the at least one spring element is configured as a helical spring.

11. The spring hinge according to claim 1, wherein the at least one spring element is configured as a meander spring.

12. The spring hinge according to claim 1, wherein at least a front side of the spring element facing the blocking body is ground and lies in an imaginary plane.

13. The spring hinge according to claim 1, wherein the blocking body has at least one pin for coupling with the at least one spring element.

14. The spring hinge according to claim 13, wherein an outer surface of the pin is cylindrical, polygon-shaped or barrel-shaped.

15. The spring hinge according to claim 1, wherein the blocking body has at least one recess for coupling with the at least one spring element.

16. The spring hinge according to claim 1, wherein the pin has a center axis which, when the hinge is locked, encloses an angle from 0° to 6° with an alignment axis of the at least one spring element.

17. The spring hinge according to claim 1, wherein the blocking body has a nose with the shape of a circular arc.

18. The spring hinge according to claim 1, wherein the blocking body can be produced with a metal powder injection molding method.

19. The spring hinge according to claim 1, wherein the hinge element, the at least one spring element, and the blocking body form a pre-assembled unit.

20. The spring hinge according to claim 1, wherein the at least one spring element is welded, soldered, or adhered to the hinge element.

21. The spring hinge according to claim 20, wherein the at least one spring element is welded, soldered, or adhered to at least one projection of the hinge element.

* * * * *